United States Patent
Inokuchi

(10) Patent No.: US 8,956,022 B2
(45) Date of Patent: Feb. 17, 2015

(54) DEVICE TO REFLECT IN A DESIRED DIRECTION A LASER BEAM EMITTED BY A LASER DEVICE MOUNTED WITH AN AIRCRAFT

(71) Applicant: Japan Aerospace Exploration Agency, Chofu-shi, Tokyo (JP)

(72) Inventor: Hamaki Inokuchi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 99 days.

(21) Appl. No.: 13/633,417

(22) Filed: Oct. 2, 2012

(65) Prior Publication Data

US 2013/0100688 A1 Apr. 25, 2013

(30) Foreign Application Priority Data

Oct. 3, 2011 (JP) ................................. 2011-219196

(51) Int. Cl.
| | |
|---|---|
| *B64D 47/00* | (2006.01) |
| *B64D 47/02* | (2006.01) |
| *G01S 17/93* | (2006.01) |
| *G01S 7/497* | (2006.01) |

(52) U.S. Cl.
CPC ............... *B64D 47/02* (2013.01); *G01S 17/933* (2013.01); *G01S 7/4972* (2013.01)
USPC ........................................... 362/470; 362/259

(58) Field of Classification Search
USPC ...................... 372/20; 362/470, 471, 472, 259
See application file for complete search history.

(56) References Cited

U.S. PATENT DOCUMENTS

| | | | | |
|---|---|---|---|---|
| 4,302,796 | A * | 11/1981 | Gustavson et al. | 362/470 |
| 5,315,296 | A * | 5/1994 | Kaiser et al. | 340/946 |
| 6,486,798 | B2 * | 11/2002 | Rast | 340/961 |
| 7,661,848 | B2 * | 2/2010 | Gunnewig et al. | 362/277 |
| 2008/0130138 | A1 * | 6/2008 | Katoh et al. | 359/728 |
| 2009/0185586 | A1 * | 7/2009 | Jhung et al. | 372/20 |
| 2013/0058092 | A1 * | 3/2013 | Anisimov | 362/259 |

FOREIGN PATENT DOCUMENTS

JP  2004-288565 A  10/2004

OTHER PUBLICATIONS

Inokuchi, Hamaki et al., "Development of an Onboard Doppler LIDAR for Flight Safety", Journal of Aircrcaft, Jul.-Aug. 2009, pp. 1411-1415, vol. 46, No. 4.

* cited by examiner

*Primary Examiner* — John A Ward
(74) *Attorney, Agent, or Firm* — Westerman, Hattori, Daniels & Adrian, LLP

(57) ABSTRACT

A laser light reflection device for an aircraft-installed laser apparatus with which, when a function check is performed on the aircraft-installed laser apparatus by emitting laser light from a parked aircraft to a body exterior, the emitted laser light can be reflected in a desired direction safely and efficiently. A reflection mirror is capable of autorotation about at least an in-plane horizontal axis thereof, and a support ring is attached to the reflection mirror to be capable of rotating about an in-plane vertical axis and the in-plane horizontal axis of the reflection mirror. A laser pointer unit formed by inserting a laser pointer into a sleeve pipe is attached to the support ring so as to be oriented toward an in-plane of the reflection mirror. A guide scope is attached to the support ring such that an optical axis thereof matches an optical axis of the laser pointer unit.

5 Claims, 10 Drawing Sheets

Fig. 1  A LASER LIGHT REFLECTION DEVICE FOR AN AIRCRAFT-INSTALLED LASER APPARATUS
100

A VIEW SHOWING A PORTION IN DETAIL

Fig. 8 AN LASER LIGHT REFLECTION DEVICE FOR AN AIRCRAFT-INSTALLED LASER APPARATUS
200

Fig. 9
(a) A VIEW SHOWING A B-PORTOIN IN DETAIL
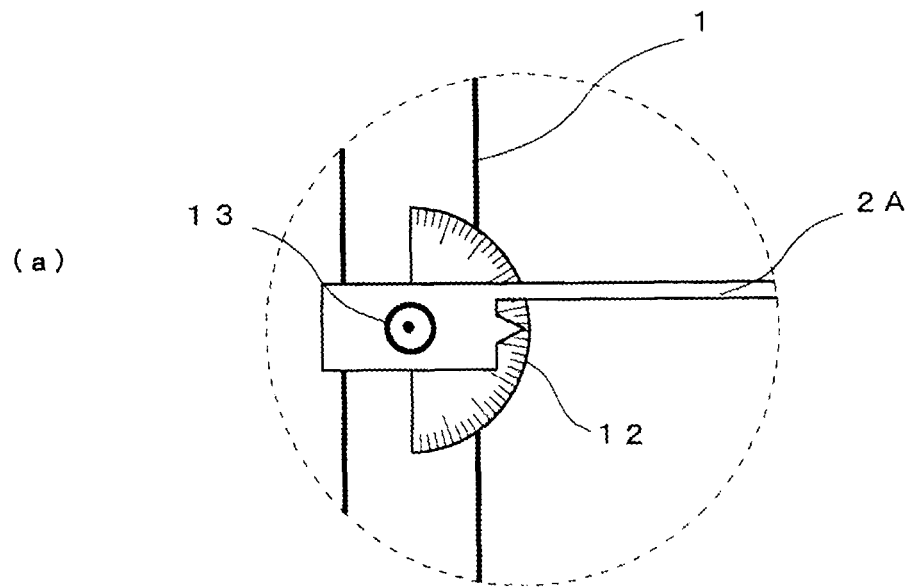
(b) A VIEW SHOWING A C-PORTOIN IN DETAIL (BACK VIEW)
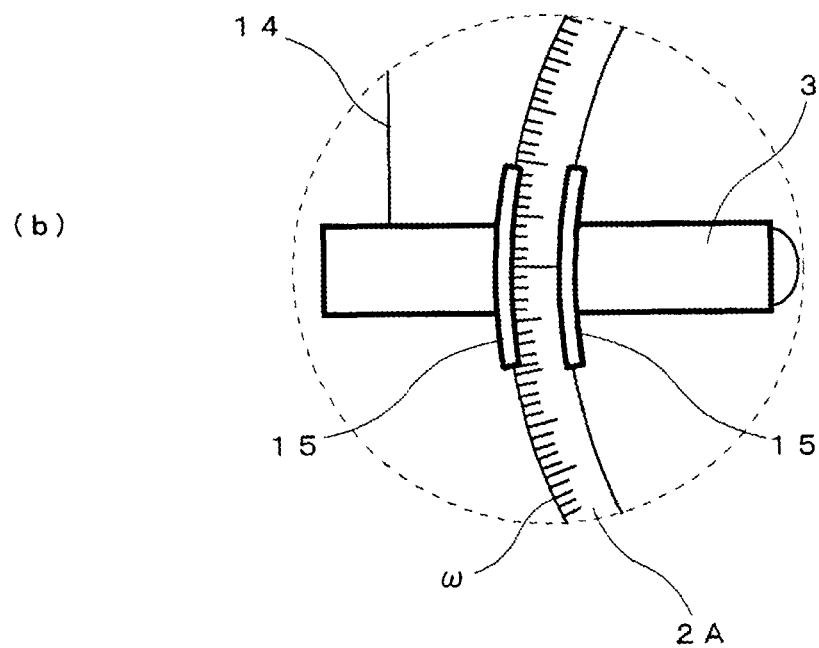

DEVICE TO REFLECT IN A DESIRED DIRECTION A LASER BEAM EMITTED BY A LASER DEVICE MOUNTED WITH AN AIRCRAFT

BACKGROUND OF THE INVENTION

1. Field of the Invention

The present invention relates to a laser light reflection method and a laser light reflection device for an aircraft-installed laser apparatus, and more particularly to a laser light reflection method and a laser light reflection device for an aircraft-installed laser apparatus with which, when a function check is performed on the laser apparatus by emitting laser light from a parked aircraft to a body exterior, a reflection mirror can be disposed in direct opposition to a laser emission direction, an elevation of a reflection direction of laser light reflected by the reflection mirror relative to a horizontal direction can be measured accurately and easily, and actual emitted laser light can be reflected in a desired direction safely and efficiently.

2. Description of the Related Art

In recent years, air turbulence has gained attention as a principle cause of aircraft accidents, and therefore research and development is being undertaken into a Doppler LIDAR using laser light as an apparatus installed in an aircraft to detect air turbulence in advance (see H. Inokuchi, H. Tanaka, and T. Ando, "Development of an Onboard Doppler LIDAR for Flight Safety," Journal of Aircraft, Vol. 46, No. 4, pp. 1411-1415, July-August 2009, for example). Note that a LIDAR is a detection method employing light, and is an abbreviation for "Light Detection and Ranging". It is also referred to as Doppler LIDAR since a wind speed is measured by receiving scattered laser light generated when an emitted light beam is scattered by minute aerosols floating in the atmosphere, and by measuring frequency variation (wavelength variation) therein due to the Doppler Effect. A LIDAR can measure local wind speeds up to a distance of approximately several tens of km simultaneously by dividing a distance in a laser emission axis direction into intervals of approximately 150 m. A wavelength in a near infrared region, which exhibits little attenuation over long distances, is used mainly as the laser light, and the safety of the laser light is high. However, taking into consideration the possibility of unanticipated convergence at great distances due to the fact that little attenuation occurs over long distances, the laser light must be emitted after confirming that no personnel are present in the laser emission direction.

When a function test is implemented on a Doppler LIDAR on the ground, the function test can be performed on a single device unit by setting a direction of a laser emission unit freely while confirming safety. However, when the device is installed in an aircraft, the laser emission unit is fixed, and when laser light is emitted from the fixed laser emission unit, the laser light may be emitted in a direction in which safety cannot be confirmed, such as in the direction of a ground surface or a building. For example, in a flight test performed on a LIDAR by the Japan Aerospace Exploration Agency (to be referred to hereafter as "JAXA"), the laser emission unit is attached at a downward orientation of 2.5 degrees relative to a body axis so that during flight, the laser light is emitted in a substantially horizontal direction. Actual measurements are taken in advance so that the body axis is oriented 1 degree downward from the horizontal direction during parking, and therefore, during parking, the laser light is emitted at a downward orientation of 3.5 degrees relative to the horizontal direction. Hence, when the laser light is emitted after the LIDAR is installed in the body, the laser light impinges on the ground surface, and in this condition, a function check cannot be performed on the LIDAR.

In response to this problem, the inventor of the present application attempted to modify the emission direction of the laser light by fixing a reflection mirror to a camera platform on a tripod.

Note that a technique of fixing a reflection mirror to a camera platform is widely known, and a known invention (see Japanese Patent Application Publication No. 2004-288565, for example) pertains to a sunlight irradiation device configured such that sunlight is reflected by a reflection mirror attached to a camera platform and emitted onto a shady portion, for example.

However, it was found that in actuality, when a laser light emission direction is reflected using a reflection mirror fixed to a camera platform on a tripod, the following three problems occur.

As a first problem, invisible infrared rays are used as the laser light, and therefore the reflection mirror cannot be disposed correctly in a center of the laser emission direction.

As a second problem, the direction in which the laser light is reflected by the reflection mirror is not known, and therefore safety cannot be confirmed in relation to the laser reflection direction.

As a third problem, an aerosol density varies greatly according to altitude, and therefore an elevation value of the laser reflection direction relative to the horizontal direction is required to calculate the approximate altitude of the wind speed to be measured. However, since the laser reflection direction is not known, the elevation value of the laser reflection direction relative to the horizontal direction cannot be calculated.

SUMMARY OF THE INVENTION

The present invention has been designed in consideration of the problems in the prior art described above, and an object thereof is to provide a laser light reflection method and a laser light reflection device for an aircraft-installed laser apparatus with which, when a function check is performed on the laser apparatus by emitting laser light from a parked aircraft to a body exterior, a reflection mirror can be disposed in direct opposition to a laser emission direction, an elevation of a reflection direction of laser light reflected by the reflection mirror relative to a horizontal direction can be measured accurately and easily, and actual emitted laser light can be reflected in a desired direction safely and efficiently.

To achieve the object described above, a laser light reflection method for an aircraft-installed laser apparatus described in one aspect of the invention includes: disposing a laser pointer on an out-of-plane vertical axis of a reflection mirror so as to be oriented in an out-of-plane direction of the reflection mirror, such that an elevation thereof relative to the reflection mirror can be adjusted; adjusting an elevation, a bearing, a levelness, or a height of the reflection mirror relative to a ground surface such that a projection point of the laser pointer scans an actual laser light transmission portion provided on a laser emission window of an aircraft; inverting the laser pointer so as to be oriented in an in-plane direction of the reflection mirror; setting the elevation of the laser pointer relative to the reflection mirror at a target elevation; setting the elevation of the reflection mirror relative to the ground surface at half the target elevation; and emitting the actual laser light onto the reflection mirror such that the actual laser light is reflected by the reflection mirror.

The inventor of the present application arrived at the present invention by focusing on the fact that when the elevation of the reflection mirror is varied by θ from a state in which an out-of-plane vertical axis (a normal of a mirror surface) of the reflection mirror matches the laser emission direction (in other words, a so-called direct opposition state in which normal of mirror surface=laser emission direction=laser reflection direction), the elevation of the laser reflection direction relative to the laser emission direction is twice θ, i.e. 2θ, and therefore, to set the elevation of the laser reflection direction relative to the laser emission direction at a desired value (2θ) from the direct opposition state, the elevation of the reflection mirror should conversely be set at a value of half 2θ (i.e. θ).

Hence, the inventor of the present application found that by implementing the method described above, in which a laser pointer having an identical direct advancement property to actual laser light but a small output and a visible projection point is disposed in the form described above relative to a reflection mirror that can be adjusted in elevation, bearing, levelness, or height relative to the ground surface such that an orientation direction of the laser pointer can be inverted (from an in-plane direction to an out-of-plane direction and from an out-of-plane direction to an in-plane direction), a state in which an emission direction of actual laser light emitted from an aircraft matches an out-of-plane vertical axis of the reflection mirror can be simulated/formed accurately by the laser pointer, and that an actual laser reflection direction relative to the actual laser emission direction can be simulated/formed accurately by the laser pointer. By employing a mechanism according to the present invention, to be described below, the elevation of the reflection direction of the actual laser light reflected by the reflection mirror relative to the horizontal direction can be measured accurately and easily, and the emitted actual laser light can be reflected in a desired direction safely and efficiently.

To achieve the object described above, a laser light reflection device for an aircraft-installed laser apparatus described in another aspect of the invention, which uses a reflection mirror configured to be capable of rotating about at least an in-plane horizontal axis thereof and such that a levelness thereof relative to a ground surface can be adjusted, includes: a ring-shaped or half ring-shaped annular frame provided to intersect the reflection mirror and to be capable of rotating about one or both of the in-plane horizontal axis and an in-plane vertical axis of the reflection mirror; a sleeve pipe provided on the annular frame so as to be oriented normally toward an in-plane of the reflection mirror; a laser pointer inserted into the sleeve pipe; and a guide scope provided on the annular frame such that an optical axis thereof matches an optical axis of the laser pointer.

With the laser light reflection device for an aircraft-installed laser apparatus described above, using laser light (to be referred to hereafter as "dummy laser light") from the laser pointer, the direct opposition state in which the reflection direction of the actual laser light emitted from the aircraft to the body exterior matches the out-of-plane vertical axis (to be referred to hereafter as a "reflection mirror center line") of the reflection mirror can be simulated/formed accurately, and at the same time, the reflection direction of the actual laser light reflected by the reflection mirror can be simulated/formed accurately.

To ensure that the orientation direction of the laser pointer can be aligned with the reflection mirror center line of the reflection mirror, the sleeve pipe into which the laser pointer is inserted is attached to the annular frame that is capable of rotating about the in-plane horizontal axis and the in-plane vertical axis of the reflection mirror so as to be oriented toward the in-plane (a reflection mirror center point, for example) of the reflection mirror, for example, and the reflection mirror to which the annular frame is attached is configured to be capable of rotating about at least the in-plane horizontal axis thereof and such that the levelness and height thereof relative to the ground surface can be adjusted.

Hence, by positioning the sleeve pipe directly above the reflection mirror (in other words, setting the orientation direction of the sleeve pipe to match the reflection mirror center line of the reflection mirror), orienting the laser pointer in the out-of-plane direction, and adjusting the elevation, bearing angle, levelness, or height of the reflection mirror such that the dummy laser light is projected onto an actual laser transmission portion on a cap attached to a laser emission window of the aircraft, the direct opposition state in which the actual laser emission direction matches the reflection mirror center line can be simulated/formed.

On the other hand, by inverting the orientation direction of the laser pointer 180 degrees such that the laser pointer is oriented toward the in-plane (simply by inverting an insertion direction of the laser pointer) and varying the elevation of the reflection mirror from the simulated direct opposition state in which the actual laser emission direction matches the reflection mirror center line, a state in which the reflection direction of the actual laser light when the actual laser light is reflected by the reflection mirror is simulated accurately can be formed easily. In this case, by having a user look through the guide scope having an optical axis that has been aligned in advance with the optical axis of the laser pointer in order to check the projection point of the dummy laser light visually, safety can be confirmed easily in relation to the reflection direction of the actual laser light when the actual laser light is reflected by the reflection mirror, for example by ensuring that obstructions and personnel do not exist in the reflection direction of the dummy laser light.

In the laser light reflection device for an aircraft-installed laser apparatus described in another aspect of the invention, the reflection mirror is attached to be capable of rotating about the in-plane horizontal axis within a U-shaped frame attached orthogonally to a horizontal platform that can be adjusted in levelness and height relative to the ground surface.

In the laser light reflection device for an aircraft-installed laser apparatus described above, by attaching the reflection mirror, to which the annular frame is attached, to the U-shaped frame having the above configuration, the reflection mirror is configured to be capable of rotating about at least the in-plane horizontal axis thereof and such that the levelness and height thereof relative to the ground surface can be adjusted, and as a result, a high degree of freedom is obtained in relation to the orientation direction of the dummy laser light. Hence, the direct opposition state in which the laser emission direction of the actual laser light emitted from the aircraft to the body exterior matches the reflection mirror center line can be simulated/formed accurately, and the reflection direction of the actual laser light reflected by the reflection mirror can be simulated/formed accurately.

In the laser light reflection device for an aircraft-installed laser apparatus described in another aspect of the invention, the sleeve pipe is configured to be capable of sliding along the annular frame.

By employing the above configuration in the laser light reflection device for an aircraft-installed laser apparatus, the annular frame mechanism can be simplified, and the elevation and the bearing of the laser pointer can be adjusted independently.

The laser light reflection device for an aircraft-installed laser apparatus described in another aspect of the invention further includes a cap marked with an actual laser light transmission portion, which is attached to a laser emission window of an aircraft.

To simulate the laser emission direction of the actual laser light emitted from the aircraft to the reflection mirror on the body exterior accurately, the levelness of the laser emission unit and the levelness of the reflection mirror must match.

Hence, in the laser light reflection device for an aircraft-installed laser apparatus described above, the levelness of the laser emission unit and the levelness of the reflection mirror are matched by attaching the cap to the laser emission window such that when the elevation and bearing of the reflection mirror are varied from the state in which the laser emission unit and the reflection mirror are in direct opposition, the dummy laser light traces the actual laser light transmission portion (a cross, for example).

In the laser light reflection device for an aircraft-installed laser apparatus described in another aspect of the invention, a scale of an elevation protractor provided on the annular frame is set at twice an actual scale.

In the laser light reflection device for an aircraft-installed laser apparatus described above, by setting the scale of the elevation protractor provided on the annular frame at twice the actual scale, focusing on the fact that when the elevation of the reflection mirror is varied by θ from the state in which the actual laser emission direction matches the reflection mirror center line of the reflection mirror (the state in which the laser emission unit and the reflection mirror are in direct opposition), a variation amount of the elevation of the actual laser light reflected by the reflection mirror is twice θ, i.e. 2θ, the elevation of the actual laser reflection direction relative to the horizontal plane when the actual laser light is reflected by the reflection mirror can be calculated by adding together a value read from the scale and an initial elevation $θ_0$.

With the laser light reflection method and device for an aircraft-installed laser apparatus according to the present invention, a direct opposition state in which an actual laser emission direction matches a reflection mirror center line of a reflection mirror can be simulated/formed accurately by a laser pointer, and an actual laser reflection direction of actual laser light entering the reflection mirror when an elevation of the reflection mirror is set at a desired angle can be simulated/formed accurately. Therefore, by having a user visually confirm a reflection direction of dummy laser light using a guide scope having an optical axis that has been adjusted to match an optical axis of the laser pointer, safety can be confirmed in relation to the reflection direction of the actual laser light when the actual laser light is reflected by the reflection mirror. Further, an elevation of the actual laser reflection direction relative to a ground surface, or an elevation of the actual laser reflection direction relative to the actual laser emission direction, can be calculated easily through a simple addition. Moreover, actual laser light emitted from an aircraft can be reflected in a desired direction safely and efficiently.

Further, by employing the laser light reflection device according to the present invention to check a laser apparatus installed in an aircraft, various adjustments, such as adjustments to a focal point position and an output of the laser apparatus, can be made using ground facilities. As a result, problems and adjustment deficiencies during flight can be forestalled.

BRIEF DESCRIPTION OF THE DRAWINGS

FIG. 9 is a view showing a C portion and a B portion of FIG. 8 in detail; and

DESCRIPTION OF THE PREFERRED EMBODIMENTS

Figure 1:
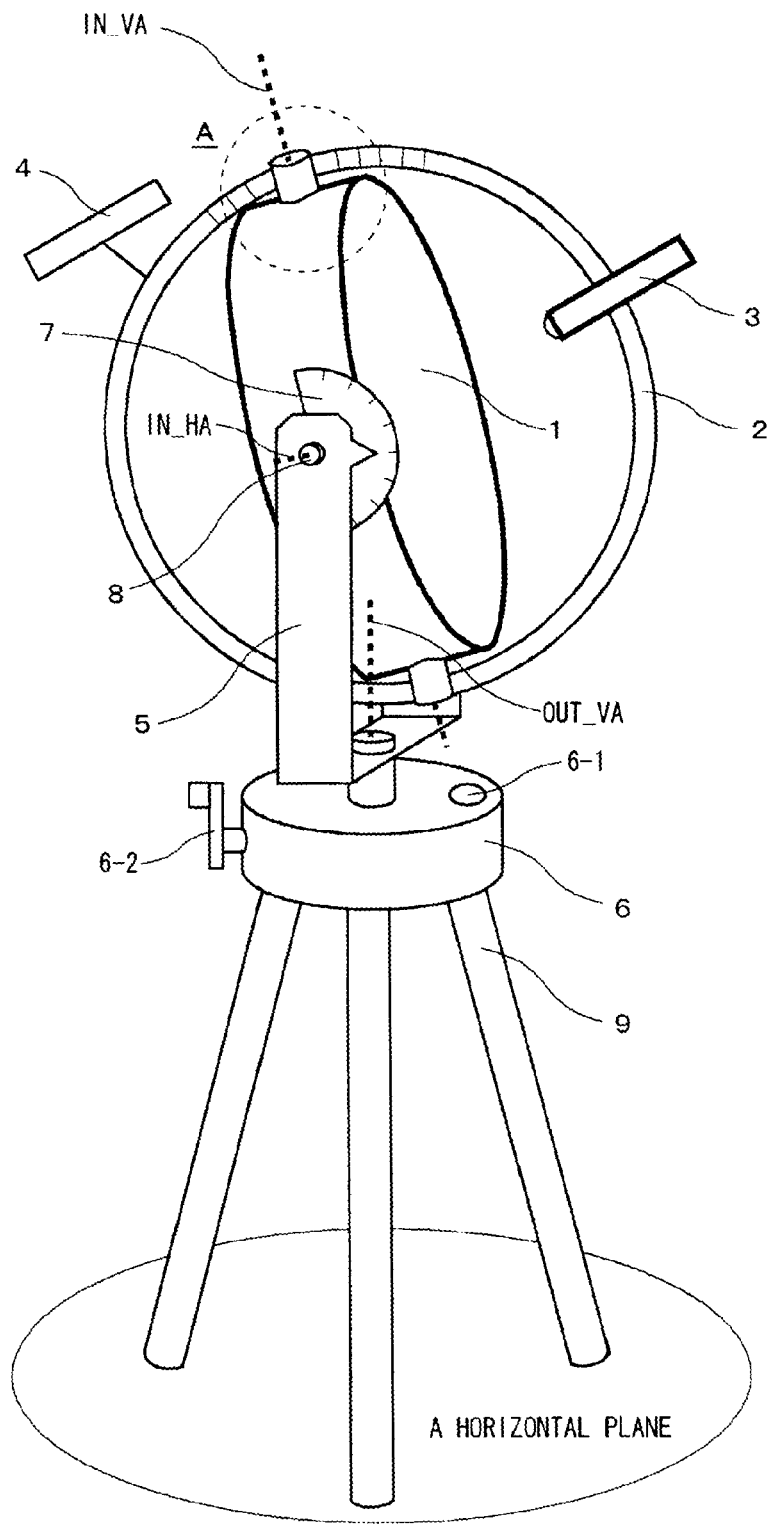
FIG. 1 is an illustrative view showing a laser light reflection device for an aircraft-installed laser apparatus according to the present invention.

The present invention will be described in further detail below through embodiments shown in the drawings.

Figure 2:
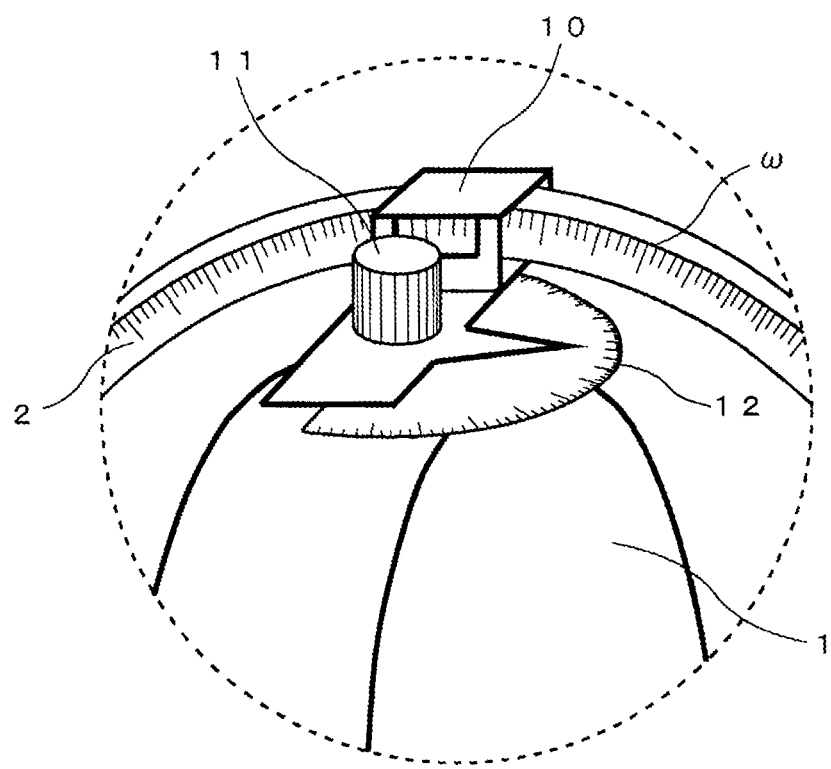
FIG. 2 is a view showing an A portion of FIG. 1 in detail.

FIGS. 1 and 2 are illustrative view showing a configuration of a laser light reflection device 100 for an aircraft-installed laser apparatus according to the present invention. FIG. 2 is a view showing an A portion of FIG. 1 in detail.

The laser light reflection device 100 for an aircraft-installed laser apparatus includes: a reflection mirror 1 capable of rotating about an in-plane horizontal axis IN_HA thereof; a ring-shaped support ring 2 (an annular frame) capable of rotating respectively about the in-plane horizontal axis IN_HA and an in-plane vertical axis IN_VA of the reflection mirror 1; a laser pointer unit 3 formed by inserting a laser pointer that emits dummy laser light into a rod-shaped sleeve pipe; a guide scope 4 for checking a projection point of the dummy laser light or actual laser light; a U-shaped frame 5 that supports the reflection mirror 1 while receiving the in-plane vertical axis IN_VA of the reflection mirror 1; a horizontal platform 6 to which the U-shaped frame 5 is attached orthogonally and which defines a degree of levelness relative to a ground surface; an elevation protractor 7 that measures an elevation of the reflection mirror 1 relative to a reference plane/line (for example, a horizontal plane, the ground surface, or the laser emission direction); an elevation fixing screw 8 that fixes an attitude of the reflection mirror 1; a tripod 9 that supports the entire device 100; a support ring retainer 10 (FIG. 2) that supports the support ring 2 to be capable of sliding; a support ring fixing screw 11 (FIG. 2) that fixes an attitude of the support ring 2; and a bearing protractor 12 (FIG. 2) that measures a bearing of the support ring 2 relative to the reflection mirror 1.

By rotating the reflection mirror 1 about the in-plane horizontal axis IN_HA, the elevation thereof relative to the horizontal plane (the ground surface) can be adjusted, and by rotating the reflection mirror 1 about an out-of-plane vertical axis OUT_VA of the horizontal platform 6 or rotating the tripod 9, the bearing of the reflection mirror 1 can be adjusted. Further, by adjusting a height of the U-shaped frame 5 relative to the horizontal platform 6 using an elevator crank 6-2, a height of the reflection mirror 1 relative to the horizontal plane can be adjusted.

Meanwhile, by rotating the support ring 2 about the in-plane horizontal axis IN_HA or the in-plane vertical axis IN_VA of the reflection mirror 1, the elevation or bearing of the support ring 2 relative to a mirror surface of the reflection mirror 1 can be adjusted. Further, the laser pointer unit 3 is formed by inserting the rod-shaped laser pointer into the likewise rod-shaped sleeve pipe, and therefore, by reversing an insertion direction thereof, the laser pointer can be adjusted easily to an in-plane orientation or an out-of-plane orientation alternatively. As a result, the dummy laser light emitted from the laser pointer unit 3 has a high degree of freedom in terms of the emission direction.

The horizontal platform 6 includes a level 6-1 and forms a horizontal plane parallel to the ground surface. The horizontal platform 6 also includes the elevator crank 6-2 for vertically displacing the U-shaped frame 5. Therefore, by operating the elevator crank 6-2, a vertical direction height of the reflection mirror 1 can be adjusted.

The elevation of the reflection mirror 1 relative to the horizontal plane is read by the elevation protractor 7, and the elevation is fixed by the elevation fixing screw 8 after being set so as not to shift.

As shown in FIG. 2, the bearing of the support ring 2 relative to the reflection mirror 1 can be adjusted using the support ring fixing screw 11 as a pivot center. A center of the support ring fixing screw 11 should strictly be on a reflection surface of the reflection mirror 1, but even when, as in this embodiment, the center of the support ring fixing screw 11 deviates slightly therefrom, the bearing is not greatly rotated, and therefore in practical terms, no problems arise. When the support ring fixing screw 11 is tightened, the support ring retainer 10 fixes the support ring 2 such that a bearing angle of the support ring 2 relative to the reflection mirror 1 can be read by the bearing protractor 12. The laser pointer unit 3 can be fixed to the support ring 2, and when the laser pointer of the laser pointer unit 3 is oriented inward, the laser pointer is fixed so as to be oriented toward the center of the reflection mirror 1 at all times. When the laser pointer is oriented outward, the orientation is opposite to the center of the reflection mirror 1, and a simple structure of inserting the laser pointer into the sleeve pipe is employed.

As shown in FIG. 1, the guide scope 4 can be attached to any part of the support ring 2. However, optical axes of the laser pointer unit 3 and the guide scope 4 are aligned in advance. The support ring 2 is structured to rotate in an elevation direction in accordance with the laser pointer unit 3 and the guide scope 4, and the elevation thereof, similarly to the bearing angle, is fixed using the support ring retainer 10 and the support ring fixing screw 11. An elevation variation amount relative to the reflection mirror 1 is read using a scale (an elevation scale ω in FIG. 2) on the support ring 2. As long as the support ring retainer 10 has been engineered carefully, the support ring fixing screw 11 can function in principle in a single location on an upper portion of the reflection mirror 1. In actuality, however, the support ring fixing screw 11 and the support ring retainer 10 are also attached to a lower portion of the reflection mirror 1, and the upper and lower components operate similarly.

As will be described in detail below, with the laser light reflection device 100 for an aircraft-installed laser apparatus according to the present invention, the reflection mirror can be disposed in a direction opposition state in which an actual laser emission direction matches a reflection mirror center line of the reflection mirror. Further, the elevation of the reflection direction of actual laser light reflected by the reflection mirror relative to the horizontal direction can be measured accurately and easily. Moreover, the actual emitted laser light can be reflected in a desired direction safely and efficiently. The laser light reflection device 100 for an aircraft-installed laser apparatus according to the present invention will be now described in further detail.

Figure 3:
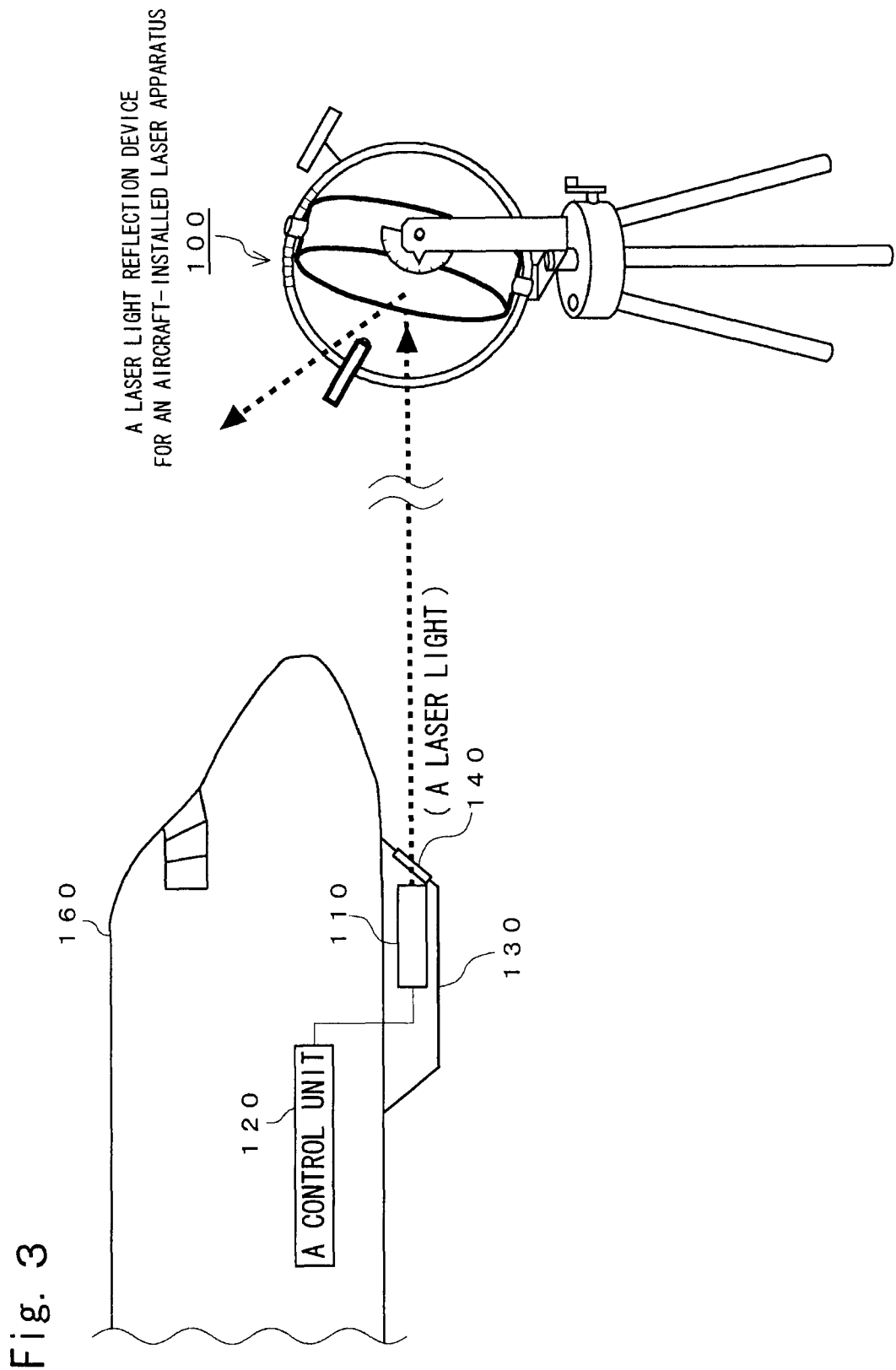
FIG. 3 is an illustrative view showing a setup of a function checking test performed on the aircraft-installed laser apparatus.

As shown in FIG. 3, in a laser apparatus installed in an aircraft, laser light is emitted from a laser emission unit 110 to a body exterior through a window 140. If necessary, a fairing 130 housing the laser emission unit 110 may be attached to a body 160, and a control unit 120 of the laser apparatus may be installed in a pressurized cabin separately from the laser emission unit 110. The laser emission unit 110 may also be installed such that the laser light is emitted in a downward orientation.

Figure 4:
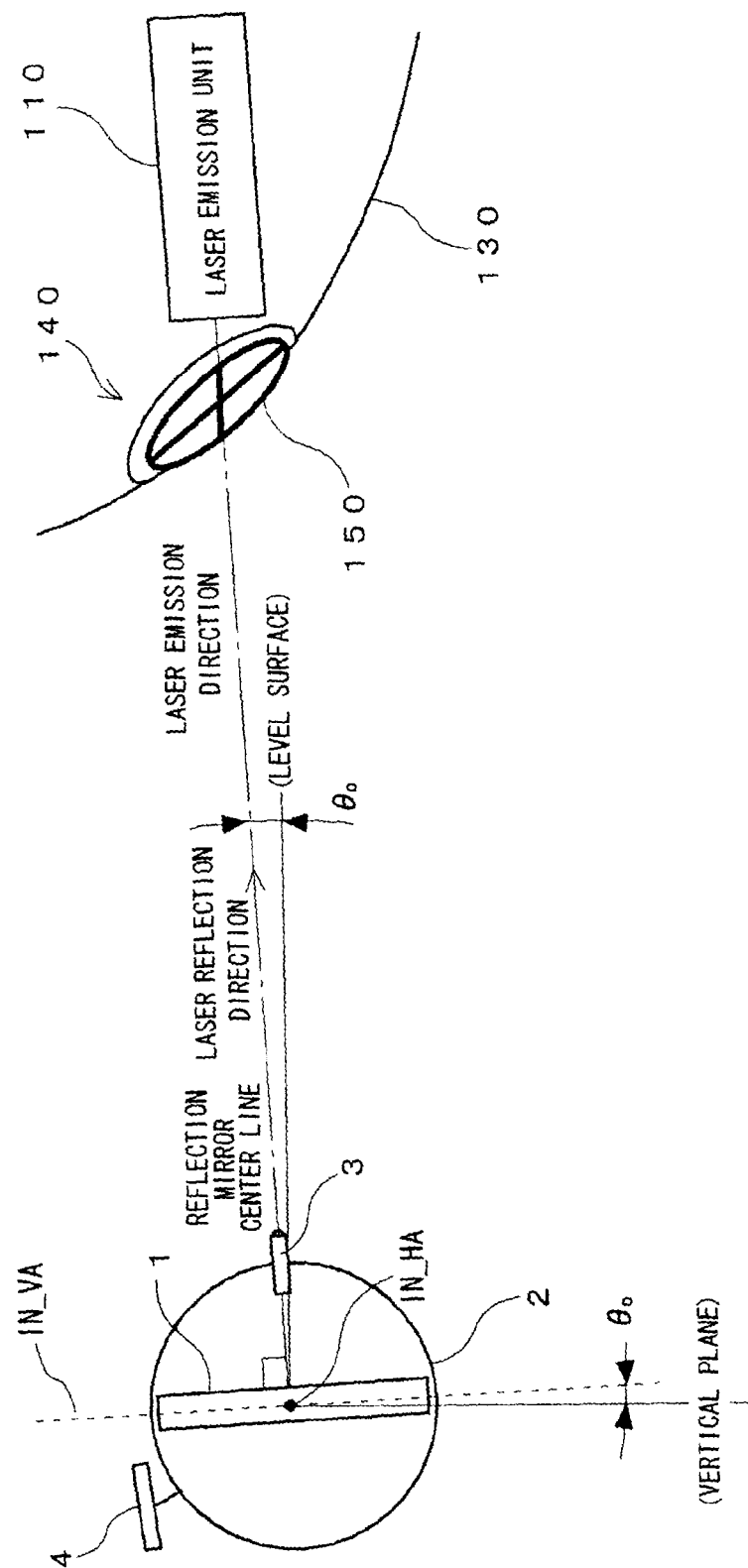
FIG. 4 is an illustrative view showing a direct opposition state (laser emission direction=reflection mirror center line) in which a laser emission direction of an actual laser emitted from a laser emission unit matches a reflection mirror center line of a reflection mirror.

FIG. 4 is an illustrative view showing the direct opposition state (laser emission direction=reflection mirror center line) in which the laser emission direction of the actual laser emitted from the laser emission unit 110 matches the reflection mirror center line of the reflection mirror 1.

To align a reflection surface center (the reflection mirror center line) of the reflection mirror with an optical axis (the laser emission direction) of the laser emitted from the laser emission unit 110, the elevation (an angle formed by the reflection mirror center line and the horizontal plane) of the reflection mirror 1 is adjusted to a known angle $\theta_0$ formed by the laser emission direction and the horizontal direction, and a position (the elevation or the bearing relative to the reflection mirror 1) of the reflection mirror 1 or the support ring 2 is adjusted such that the laser pointer unit 3, which is fixed in an outward orientation on the reflection mirror center line, irradiates a center of the window 140. A cap 150 formed with a marking (crossed lines constituted by a horizontal scanning line and a vertical scanning line of the actual laser light, for example) is placed on the body side window 140 in a region through which the actual laser light is transmitted.

Figure 5:
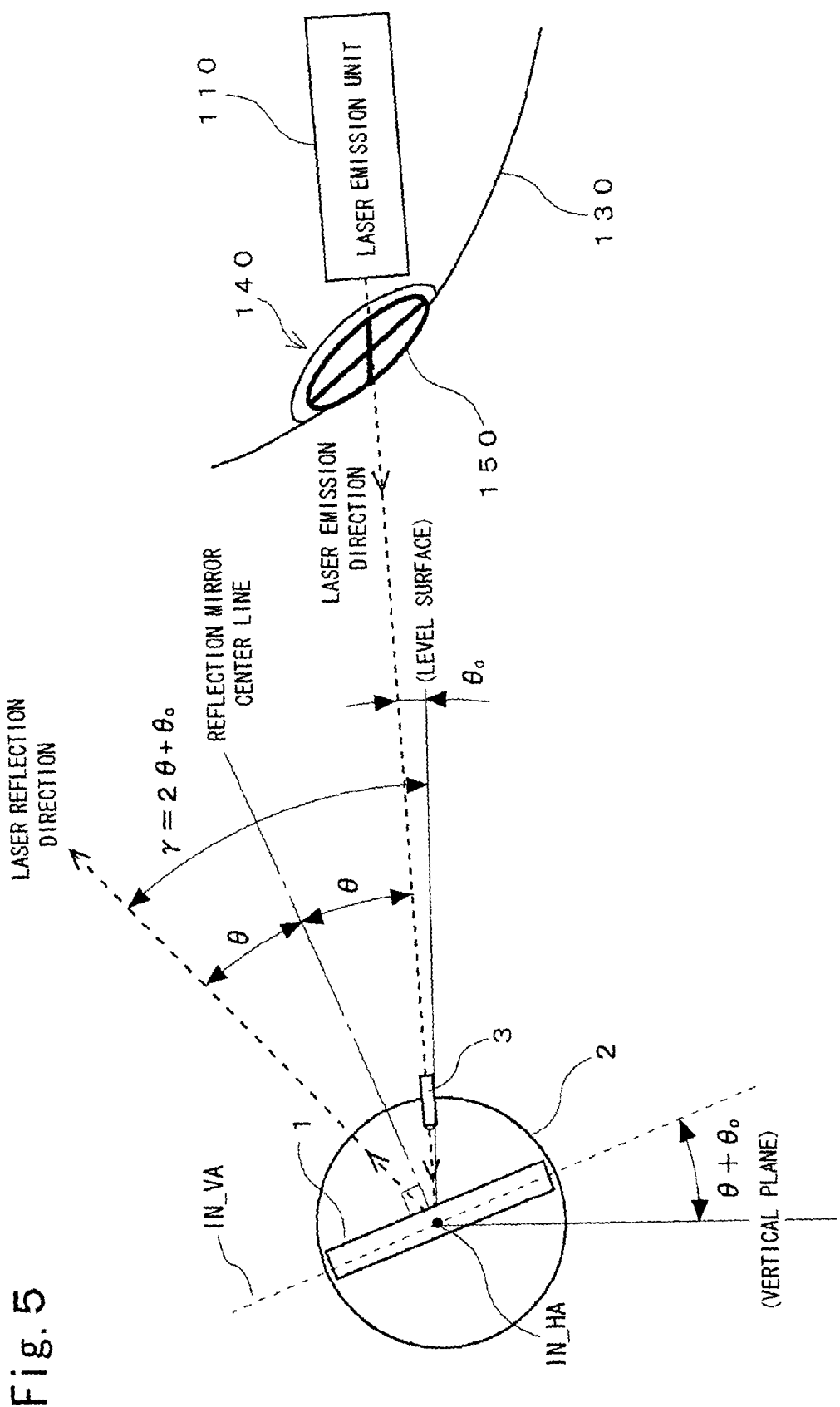
FIG. 5 is an illustrative view showing an elevation of a laser reflection direction when an elevation of the reflection mirror is varied from the direct opposition state in which the laser emission direction of the actual laser emitted from the laser emission unit matches the reflection mirror center line of the reflection mirror.

When the fixed support ring 2 is released and the elevation of the reflection mirror 1 is varied from the direct opposition state shown in FIG. 4, the laser reflection direction varies by twice the elevation variation amount (=θ) of the reflection mirror 1, as shown in FIG. 5. When, at this time, an angle formed by the reflection mirror center line and the orientation direction of the laser pointer is set at θ, an angle formed by the reflection mirror center line and the laser emission direction is also θ, and therefore an elevation γ of the laser reflection direction relative to the horizontal plane can be determined from $\gamma = 2\theta + \theta_0$. When, at this time, an angle scale of θ is expressed by ω, which is twice the actual angle, $\gamma = \omega + \theta_0$ is established, and therefore the elevation γ of the laser reflection direction relative to the horizontal plane can be determined by a simple addition. By determining the elevation γ of the laser reflection direction relative to the horizontal plane, an observation altitude H of the LIDAR can be calculated from $H = R \sin \gamma$, wherein R is an observation range.

The bearing angle in the horizontal direction can be determined similarly, but there is typically no need to determine the bearing angle as a numerical value, and it is therefore sufficient to dispose the reflection mirror 1 carefully on the laser optical axis, taking into consideration the left-right symmetry of the body and so on.

Some LIDARs employ a method of emitting laser light directly downward from the body in order to observe lower layer atmospheric conditions below a flight altitude. However, a ground function checking test can be performed similarly on this type of LIDAR using this reflection mirror.

Figure 6:
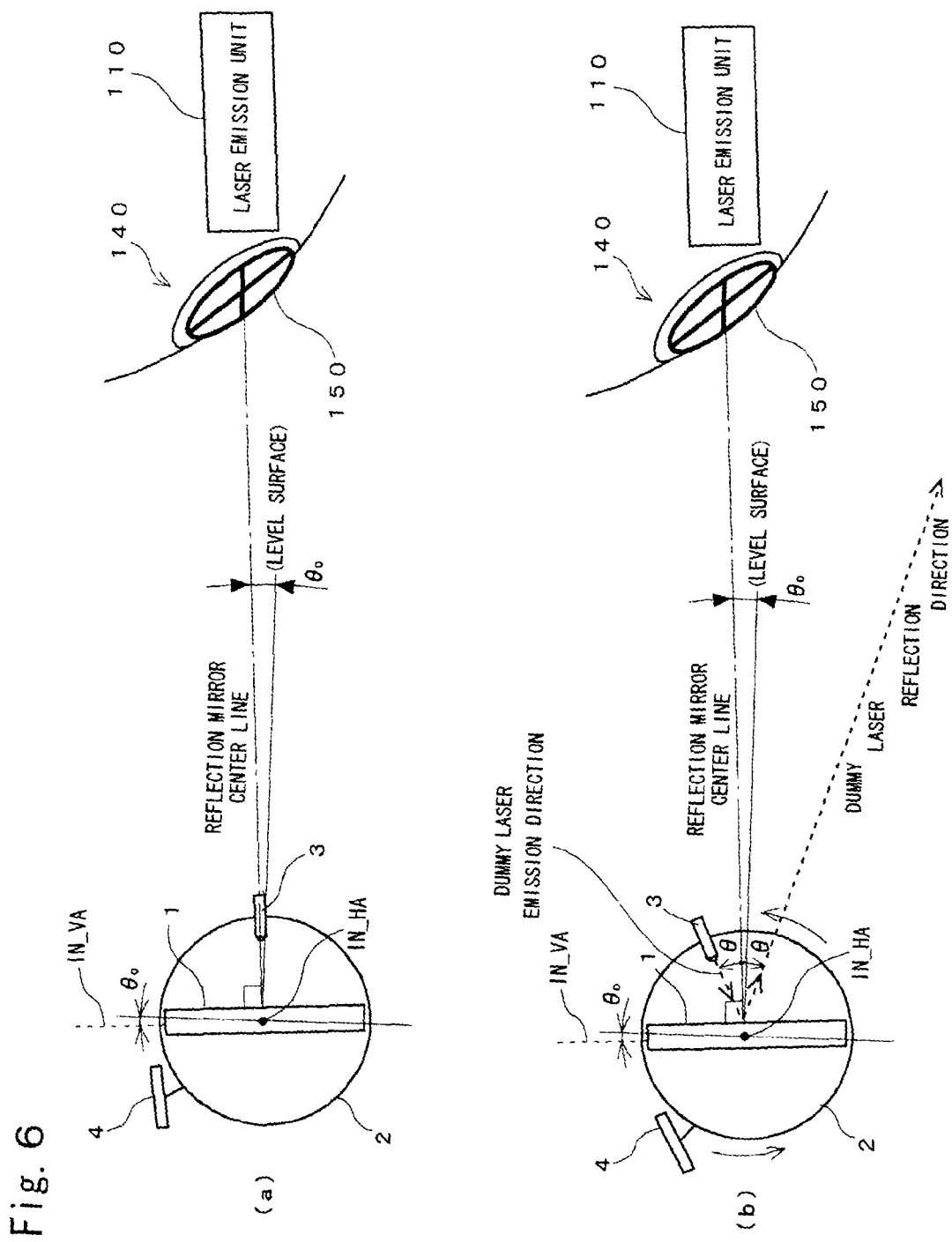
FIG. 6 is an illustrative view showing a procedure for using the laser light reflection device for an aircraft-installed laser apparatus according to the present invention.
Figure 7:
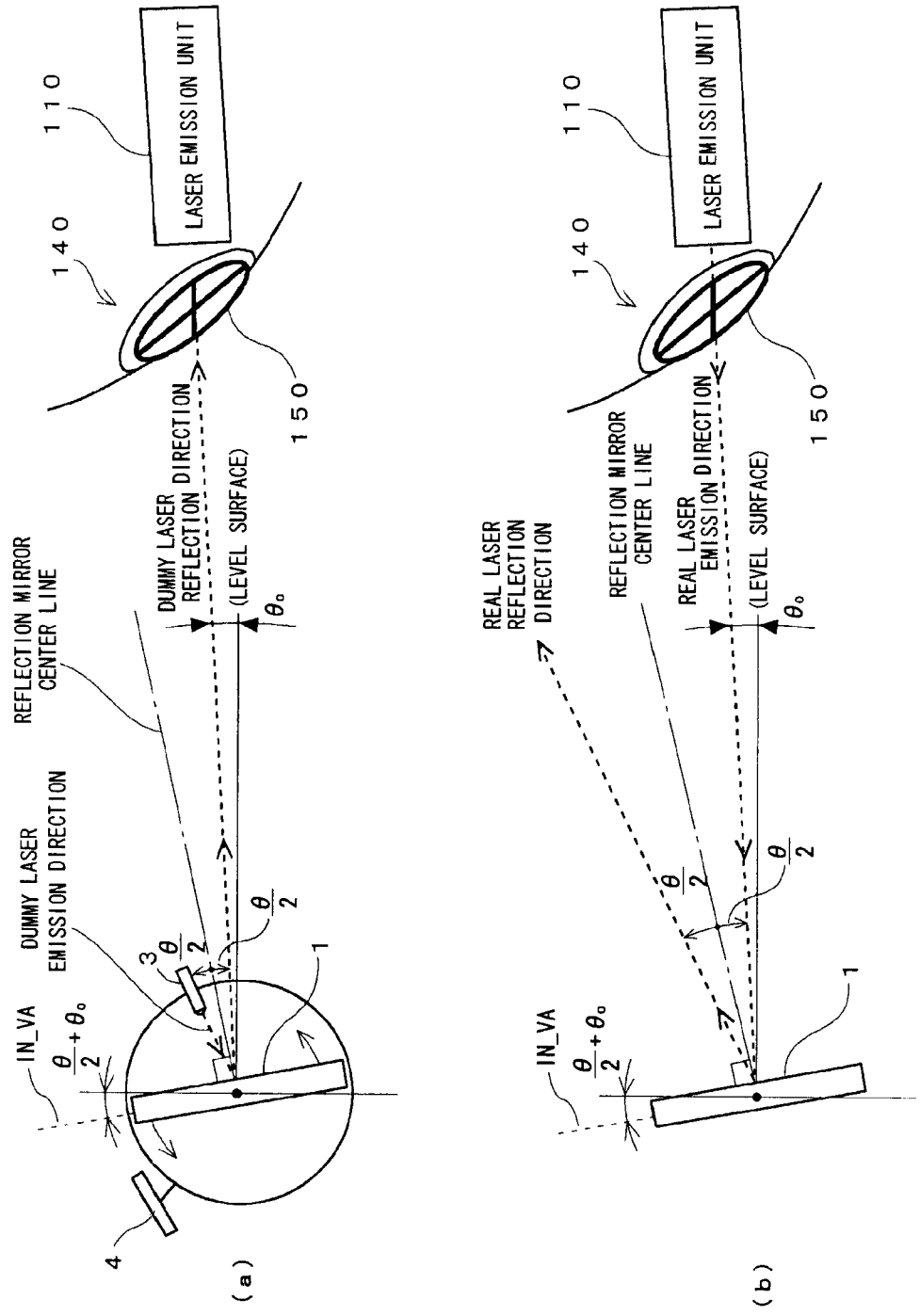
FIG. 7 is an illustrative view showing a procedure for using the laser light reflection device for an aircraft-installed laser apparatus according to the present invention.

FIGS. 4, 6, and 7 are illustrative view showing procedures for using the laser light reflection device 100 for an aircraft-installed laser apparatus according to the present invention.

As shown in FIG. 4, prior to use, the guide scope 4 is attached to the support ring 2 in an appropriate position and optical axis alignment is performed in relation to the laser pointer unit 3. Optical axis alignment can be executed by irradiating a remote object using the laser pointer unit 3 and visually observing a resulting projection point using the guide scope 4. Even when the irradiation point is not especially remote, optical axis alignment can be performed precisely by correcting an attachment position deviation between the laser pointer unit 3 and the guide scope 4.

Once optical axis alignment has been achieved, first, the cap 150 having the cross marking is placed on the window 140. The laser pointer unit 3 is then fixed in an outward orientation on the reflection mirror center line of the reflection mirror 1. In other words, the upper portion scale (the elevation scale ω in FIG. 2) of the support ring 2 is aligned with 0. At the same time, the support ring fixing screw 11 is tightened while viewing the bearing protractor 12 such that the support ring 2 is fixed perpendicular to the reflection mirror 1. As described above, in the LIDAR experiment implemented by JAXA, the laser light is emitted at a downward orientation of 3.5 degrees relative to the horizontal plane (the ground surface) during parking, and therefore the reflection mirror center line of the reflection mirror 1 is set at a laser emission elevation of 3.5 degrees while viewing the elevation protractor 7. Next, a center of the tripod 9 is disposed approximately in the laser emission bearing, whereupon the tripod 9 is disposed horizontally using the level 6-1. Next, the height of the reflection mirror 1 is adjusted using the elevator crank 6-2 so that the projection point of the laser pointer unit 3 is aligned with the center of the cross on the cap 150. At the same time, the reflection mirror 1 is rotated in the horizontal plane such that the bearing thereof is also aligned. The elevation of the reflection mirror 1 is then varied to check alignment with a vertical line of the cross, and when a deviation occurs, level adjustment is performed again by shifting the position of the tripod 9. This operation is effective in a case where the window 140 is attached at a considerable angle relative to a vertical line, and in the experiment implemented by JAXA, the angle of the window was 53.5 degrees. When the angle is small, the precision of the bearing decreases, and therefore another target index must be provided.

When the reflection mirror 1 directly opposes the laser emission direction as a result of the procedures described above, the laser pointer unit 3 is set in the inward orientation, as shown in FIG. 6A. Next, as shown in FIG. 6B, the support ring fixing screw 11 is loosened in order to rotate the elevation direction of the support ring 2 and align the scale with an approximate planned elevation value. At this time, the angle scale ω of the support ring 2 is twice the actual angle, and therefore an actual elevation of the laser pointer unit 3 is half that on the scale. Next, as shown in FIG. 7A, the elevation of the reflection mirror 1 is adjusted such that the projection point of the laser pointer unit 3 is aligned with the center of the cross on the cap 150. If necessary, a planned laser emission bearing is determined by adjusting the bearing of the support ring 2 and the bearing of the reflection mirror 1. Finally, the presence of obstructions or the like in the laser emission direction is checked visually using the guide scope 4, and if no problems exist, the actual laser is emitted, as shown in FIG. 7B. If necessary, the observation altitude is calculated using the formula described above.

Figure 8:
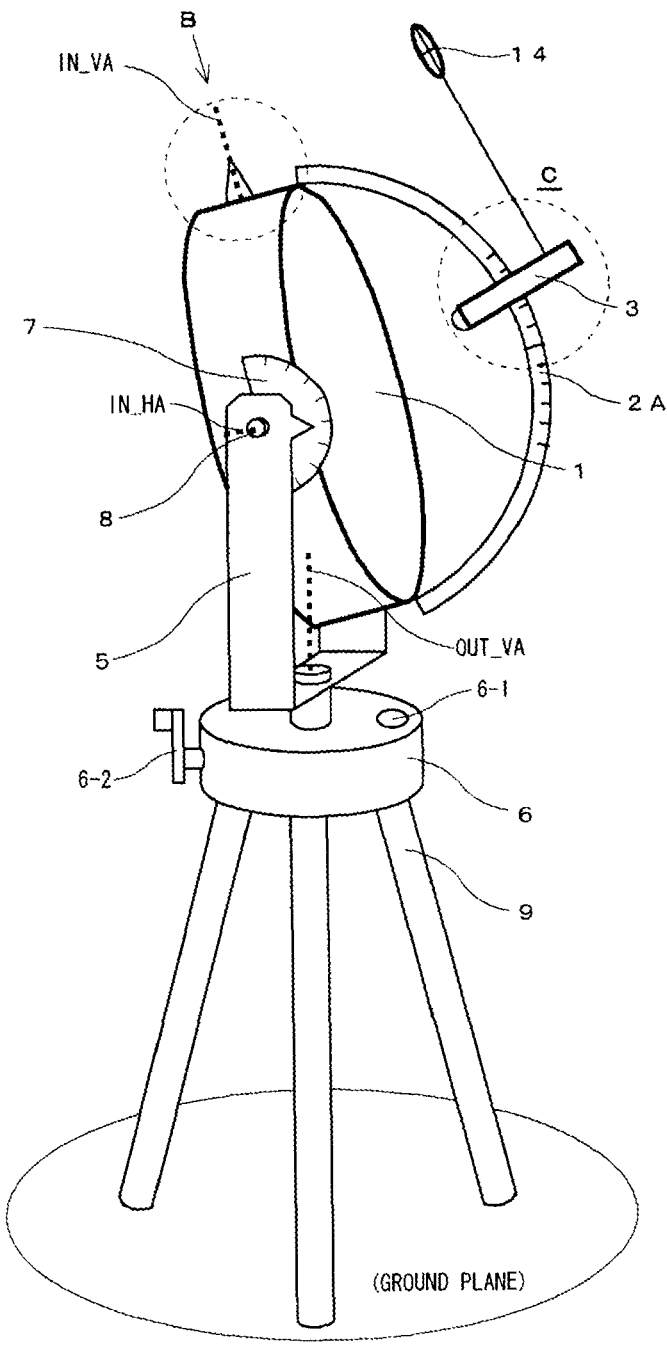
FIG. 8 is an illustrative view showing another laser light reflection device for an aircraft-installed laser apparatus according to the present invention.

FIG. 8 is an illustrative view showing another laser light reflection device 200 for an aircraft-installed laser apparatus according to the present invention.

This laser light reflection device 200 for an aircraft-installed laser apparatus differs from the laser light reflection device 100 in that a support ring 2A is configured to be capable of rotating only about the in-plane vertical axis IN_VA of the reflection mirror 1, and instead, the laser pointer unit 3 is configured to be capable of sliding along the support ring 2A. Accordingly, a rear sight 14 is fixed to the laser pointer unit 3 in place of the guide scope 4.

During high altitude observation using a Doppler LIDAR, the aerosol density decreases, leading to a reduction in observation capability, and therefore, in practice, the laser emission elevation is often set at no more than 10 degrees. Hence, even with a simplified configuration such as that shown in FIG. 9A, in which a front sight 13 is fixed to the reflection mirror 1, a visual error in the elevation remains within a negligible range. In this embodiment, the support ring 2A takes a semicircular shape (a half ring shape) so as to extend around only the reflection surface side of the reflection mirror 1, and the front sight 13 doubles as a support ring fixing screw. As a result, a rotary portion of the support ring 2A can be engineered easily, thereby facilitating independent adjustment of the bearing and the elevation. Use procedures are basically identical to those of the laser light reflection device 100, but in a method of adjusting the elevation of the laser pointer unit 3 relative to the reflection mirror 1, instead of rotating the support ring 2A itself, the laser pointer unit 3 is caused to slide along the support ring 2A via a slide rail 15 using the angle scale ω inscribed on the support ring 2A, which is twice the actual angle, as shown in FIG. 9B. The laser emission direction can be checked by viewing the front sight 13 and the rear sight 14 in alignment.

Figure 10:
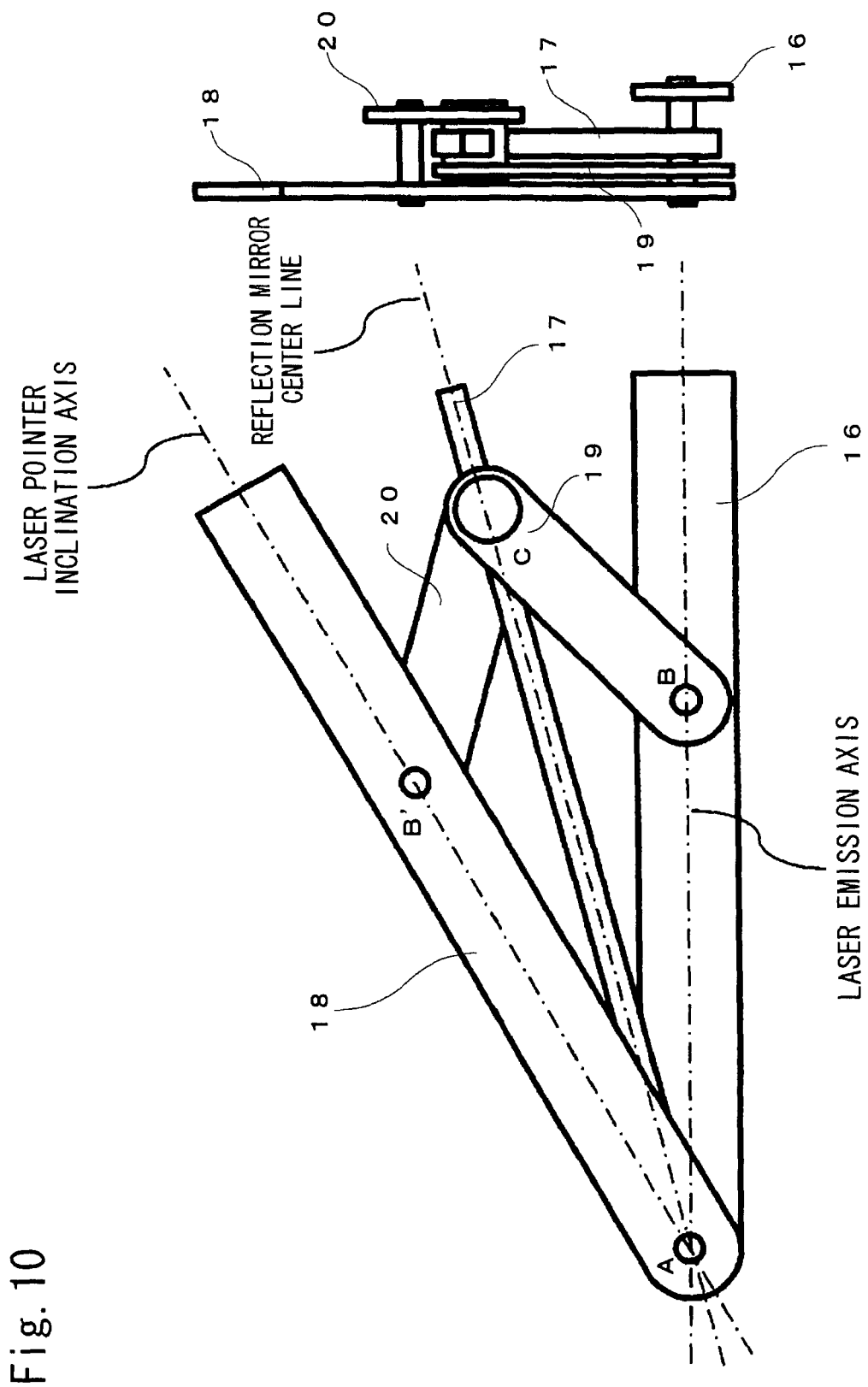
FIG. 10 is an illustrative view showing a simple laser reflection direction checking mechanism according to the present invention.

FIG. 10 is an illustrative view showing a simple laser reflection direction checking mechanism according to the present invention.

This mechanism is constituted by a first orientation piece 16 that orients the actual laser emission direction, a second orientation piece 17 that orients the reflection mirror center line, a third orientation piece 18 that orients the laser pointer unit 3, a first link piece 19 that links the first orientation piece 16 and the second orientation piece 17, a second link piece 20 that links the second orientation piece 17 and the third orientation piece 18, and fixing pins A, B, B', C. Note that setting is performed such that AB=AB' and BC=CB'.

Hence, for example, by fixing the first orientation piece 16 in the actual laser emission direction in the direct opposition state (FIG. 4) in which the actual laser emission direction matches the reflection mirror center line such that the elevation of the reflection mirror 1 is linked to "an angle formed by the second orientation piece 17 and the first orientation piece 16", the laser reflection direction of the actual laser when the actual laser is reflected by the reflection mirror 1 can be predicted from the orientation direction of the third orientation piece 18.

The laser light reflection device for an aircraft-installed laser apparatus according to the present invention is capable of executing a function check on a laser device installed in an aircraft safely and efficiently, and can therefore be used not only for experiments but also for inspections and maintenance on an actual laser apparatus.

What is claimed is:

1. A device to reflect, in a desired direction, a laser beam emitted by a laser device mounted with an aircraft, which uses a reflection mirror configured to be capable of rotating about at least an in-plane horizontal axis thereof and such that a levelness thereof relative to a ground surface can be adjusted, comprising:

a ring-shaped or half ring-shaped annular frame provided to intersect the reflection mirror and to be capable of rotating about one or both of the in-plane horizontal axis and an in-plane vertical axis of the reflection mirror;

a sleeve pipe provided on the annular frame so as to be oriented normally toward an in-plane of the reflection mirror;

a laser pointer inserted into the sleeve pipe; and a guide scope provided on the annular frame such that an optical axis thereof matches an optical axis of the laser pointer.

2. The device to reflect, in the desired direction, the laser beam emitted by the laser device mounted with the aircraft according to claim 1, wherein the reflection mirror is attached to be capable of rotating about the in-plane horizontal axis within a U-shaped frame attached orthogonally to a horizontal platform that can be adjusted in levelness and height relative to the ground surface.

3. The device to reflect, in the desired direction, the laser beam emitted by the laser device mounted with the aircraft according to claim 1, wherein the sleeve pipe is configured to be capable of sliding along the annular frame.

4. The device to reflect, in the desired direction, the laser beam emitted by the laser device mounted with the aircraft according to claim 1, further comprising a cap marked with an actual laser light transmission portion, which is attached to a laser emission window of an aircraft.

5. The device to reflect, in the desired direction, the laser beam emitted by the laser device mounted with the aircraft according to claim 1, wherein a scale of an elevation protractor provided on the annular frame is set at twice an actual scale.

* * * * *